R. H. RICE.
VEHICLE.
APPLICATION FILED MAR. 15, 1912.

1,071,348.

Patented Aug. 26, 1913.

2 SHEETS—SHEET 1.

Witnesses:

Inventor,
Richard H. Rice,
by John A. McManus, Jr.
Att'y.

R. H. RICE.
VEHICLE.
APPLICATION FILED MAR. 15, 1912.
1,071,348.
Patented Aug. 26, 1913.
2 SHEETS—SHEET 2.
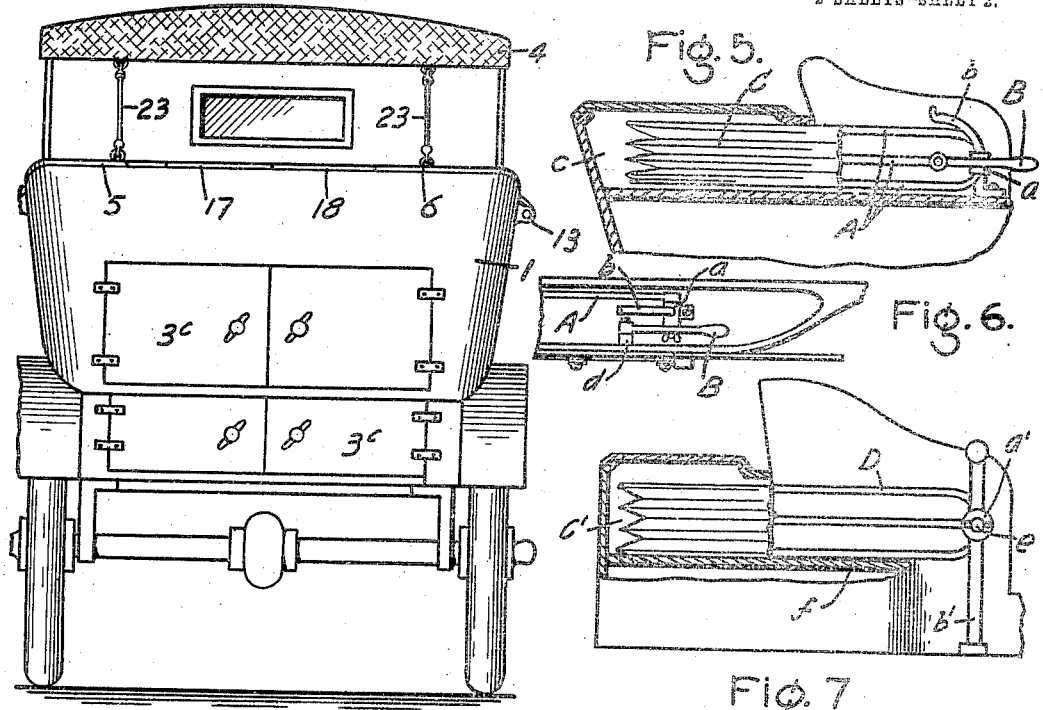
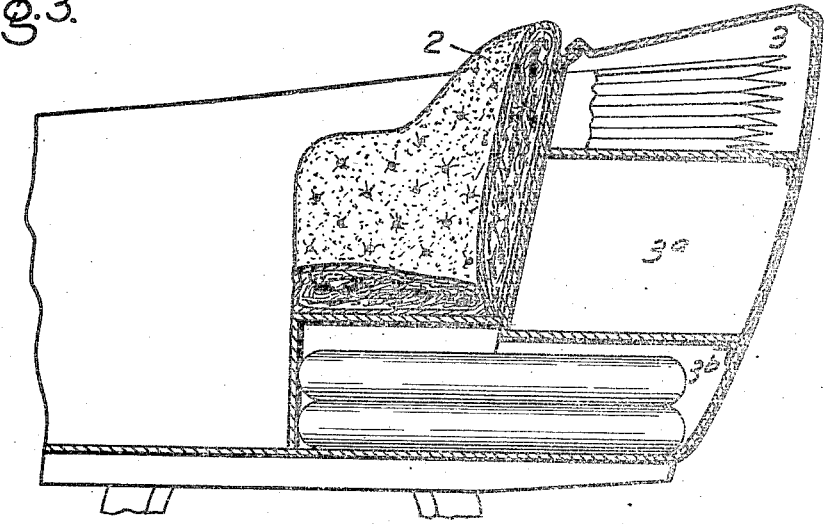
Witnesses:
Inventor,
Richard H. Rice,
by
Att'y.

UNITED STATES PATENT OFFICE.

RICHARD H. RICE, OF LYNN, MASSACHUSETTS.

VEHICLE.

1,071,348.

Specification of Letters Patent. Patented Aug. 26, 1913.

Application filed March 15, 1912. Serial No. 684,026.

*To all whom it may concern:*

Be it known that I, RICHARD H. RICE, a citizen of the United States, residing at Lynn, in the county of Essex and State of Massachusetts, have invented certain new and useful Improvements in Vehicles, of which the following is a specification.

This invention relates to vehicles, such as automobiles, of that kind having tops which can be folded or collapsed and lowered to a horizontal position behind the operator's seat, in case the car is of the runabout or single seat type, or behind the rear seat as in a touring or double seated car. The top, when not in use, is an unsightly appurtenance to the vehicle, and requires a covering case to keep it clean from dust, the use of which case or jacket is more or less troublesome to put on and take off.

The objects of the present invention are to provide an improved body wherein a chamber or receptacle is formed behind the seat for the accommodation of the top when it is collapsed, thus concealing the top from view and protecting it from dust as the top-receiving chamber or receptacle is provided with covering means, such as hinged door sections that close over the collapsed top when let down into the chamber. Additional chambers or compartments are or may be provided to store extra tires, luggage and the like. Owing to the raking back of the seat, the top door or cover sections for the top-receiving chamber are connected to the body by special hinges so that the door sections, which when in closed position are close to the raking back of the seat, can be first slipped rearwardly a sufficient distance to clear the back as they swing open.

Another feature of the invention is a novel form of connection between the bows of the top and the body of the vehicle whereby the collapsed top, in being lowered into the chamber or receptacle, can be drawn forwardly so that the chamber need not be made so large as would otherwise be necessary.

With the foregoing objects in view, and others, as will appear as the description proceeds, the invention comprises the various novel features of construction and combination of parts as will be more fully described hereinafter and set forth with particularity in the appended claims.

Figure 1:
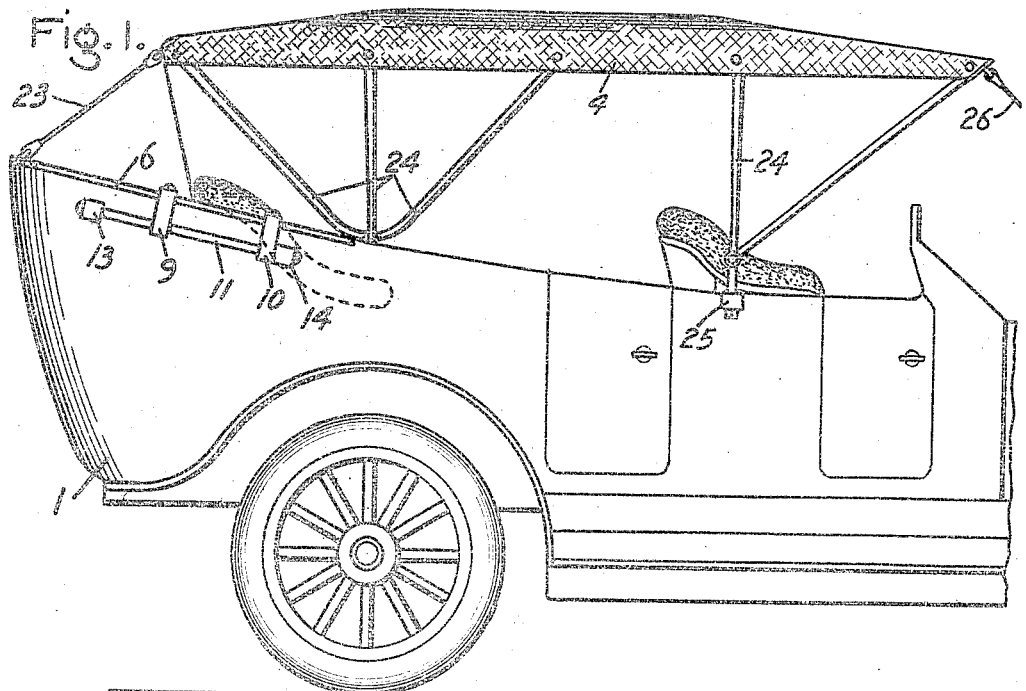
Figure 2:
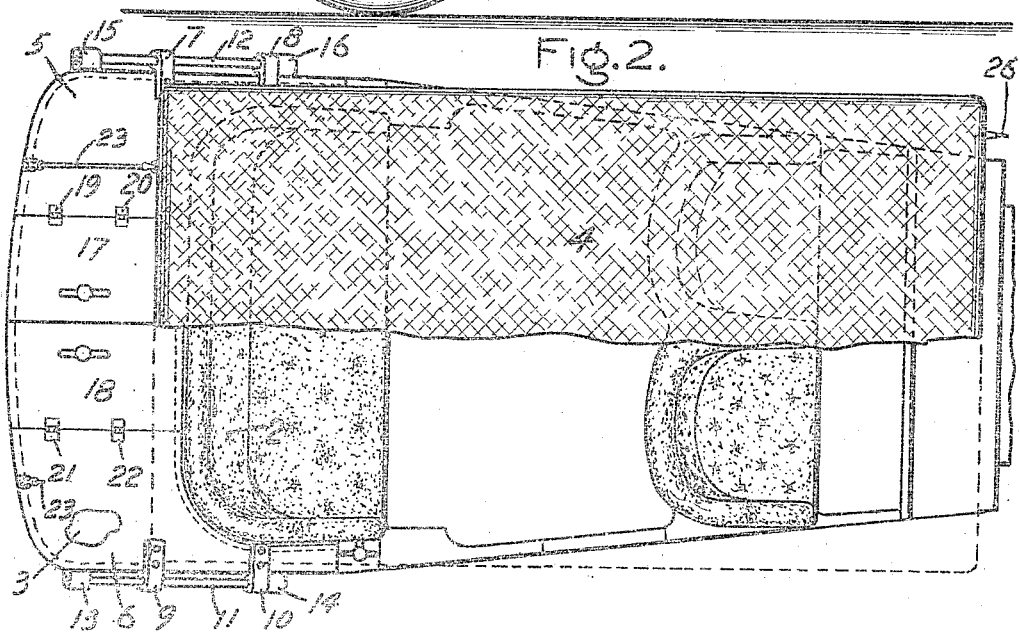

In the accompanying drawings, which illustrate certain embodiments of the invention, Figure 1 is a partial view of one type of the vehicle, showing the top in raised or operative position. Fig. 2 is a plan view with a portion of the top broken away. Fig. 3 is a rear view. Fig. 4 is an enlarged longitudinal sectional view of the rear portion of the vehicle body. Fig. 5 is a fragmentary sectional view of a runabout type of car. Fig. 6 is a plan view of a portion of Fig. 5, showing the connecting means between the top and body, and also showing a door section hanging open. Fig. 7 is another form of car showing a modified form of connecting means between the top and body.

Referring to the drawings, 1 designates the body of the vehicle which has the rear portion extended beyond the rear seat 2 so as to provide a receptacle or chamber 3 for receiving the top 4, which is of the bow type. Other compartments $3^a$ and $3^b$ may be provided in the body for the reception of luggage, tires, etc., said compartments being open and accessible at the rear where doors $3^c$ are provided as shown in Fig. 3. The receptacle 3 is open at the top to permit the vehicle top 4, when collapsed, to be swung down rearwardly into the same and to cover the lowered top, door or cover sections 5 and 6, Fig. 2, are provided. The door sections have hinged ears 7, 8, 9 and 10 connected respectively with pintle rods 12 and 11. The rod 11 is fastened by brackets or equivalent means 13 and 14 to one side of the vehicle body while the pintle rod 12 is fastened by brackets 15 and 16 to the other side. The door sections, when in closed position, are disposed with their front edges close to the rear of the seat 2, and in order for the door sections to be swung open, they are slid rearwardly on the pintle rods far enough to enable the door sections to clear the seat back during the open swinging movement. The top-receiving chamber 3 extends along the sides of the seat and the door sections are made to cover these forwardly-extending side portions of the chamber. To enable the door sections to be better handled, they have their inner parts 17 and 18, respectively, separate and connected by hinges 19, 20 and 21, 22 with the main outer parts, as shown in Fig. 2. It will be observed from Fig. 1 that the rods 11 are inclined upwardly to the rear so that any tendency of the doors 5 and 6 to slide rearwardly, is opposed. The rear bracing straps 23, when the top is raised and in use, prevent the door from moving backward on the pintle rods 11 as the straps are connected with the door sections. When the top is to be lowered, the straps 23 are unfastened and the doors 5 and 6 swing open to a pendant position on the rods 11. The front bows 24 are unfastened from the brackets 25 after the front bracing straps 26 are detached and the top is collapsed in the usual manner, and lowered into the compartment 3. The door sections 5 and 6 are then returned to closed position so as to completely inclose the folded top.

The rear bows 24 of the top may be connected with the body in any suitable manner, and if desired, a connecting means such as shown in Figs. 5 and 6 may be employed, for the tonneau type of car as well as for the runabout style. In Figs. 5 and 6, the bows A of the top C are connected with the sleeve $a$ which is adapted to slide on an arcuate or sector-shaped bracket $b$ secured within the side portions of the top-receiving chamber or receptacle $c$ in the body of the vehicle, and attached to this sleeve is an operating lever B which is fulcrumed at $d$ in line with the center of curvature of the bracket $b$. When the top is down, as shown in Figs. 5 and 6, the handle B is horizontal and when the top is raised, the handle is thrown upwardly to carry the sleeve $a$ to the top portion of the bracket $b$, so that the top will be supported at the proper height, and it is obvious that when the top is lowered and assumes the position shown in the figures, a forward movement is imparted to the top, by reason of the sleeve $a$ sliding on the bracket $b$ so that as the result, the compartment $c$ in which the top is stored need not be of such large dimension, as would otherwise be the case. It is to be understood that the brackets $b$, sleeve $a$ and handle B are duplicated on the opposite side of the vehicle.

Another form of connection between the vehicle top and body is shown in Fig. 7, wherein the bracket $b'$ is in the form of a standard and the slidable member $a'$ is adapted to be clamped in fixed position by a set screw $e$. The bows D of the top are connected with the slide $a'$, so that the top can be raised or lowered on the standard by the slide moving up or down. When the top is collapsed, as shown in Fig. 7, the slide will be in its lowermost position while the top rests on the bottom $f$ of the chamber or receptacle $c'$, and when the top is raised, the slide $a'$ will be close to the top of the standard and held in such position by the tightening of the set screw $e$.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new is:—

1. The combination with a vehicle body having a seat provided with a raking back, and a receptacle in the body behind the said seat, and cover means for the receptacle, and hinges connecting the cover means with the body and permitting the said means to be shifted rearwardly to clear the raking back of the seat as the cover means opens, of a cover or top mounted on the body to collapse into the receptacle when the cover means thereof is open.

2. The combination of a vehicle body having a seat provided with a raking back, a receptacle in the bottom extending around the rear and sides of the seat, cover sections or doors for closing the receptacle, bars secured to the sides of the body, means for hingedly and slidably connecting the doors to the bars for permitting the doors to slide rearwardly to position to clear the raking back of the seat as the doors swing open, and a cover or top mounted on the body to collapse into the receptacle when the doors are open and to be covered by the doors.

3. The combination of a vehicle body having a top-receiving receptacle at its back portion and a seat in front of the receptacle, with a top connected with the body and adapted to be lowered into the receptacle, a cover for the receptacle, and means hingedly and slidably connecting the cover with the body, the axis on which the cover swings being inclined in a direction whereby the cover is maintained close to the said seat.

4. The combination of a vehicle body having a seat and a top-receiving receptacle behind the same, with a collapsible top adapted to be lowered into the receptacle, a cover for the receptacle, hinged means connecting the cover with the body and permitting the cover to slide rearwardly, and top bracing means connected with the said top and with the cover and serving to prevent the cover from moving from its proper position.

5. The combination of a vehicle body having a seat and a receptacle behind the seat, with a collapsible top connected with the body and adapted to lower into the receptacle, door or cover sections for the receptacle, elements on the body to which the door sections are hingedly and slidably connected, and bracing elements between the top and door sections and detachably connected with the latter.

6. The combination of a vehicle body having a seat and a receptacle at the rear and sides of the seat, a top including bows, fixed members in the receptacle, sleeves on the members and adapted to occupy different positions when the top is in open and collapsed positions, connections between the sleeves and bows of the top, and handles fulcrumed on the body and connected with the sleeves for shifting the same on the said members.

7. The combination of a vehicle body having a seat and a receptacle extending along the rear and sides of the seat, fixed arcuate bracket members arranged in the side portions of the receptacle and in a vertical plane, members slidable on the bracket members, a top having bows connected with the slidable members, and handles fulcrumed on the body and connected with the slidable members for shifting the position thereof as the top is changed from operative to inoperative position or vice versa.

8. The combination of a vehicle body, a top having bows, fixed arcuate members on the body, operating handles fulcrumed on the body on centers coincident with the center of curvature of the said members, sleeves slidable on the members and connected with the operating handles, and hinged connections between the bows and sleeves.

In testimony whereof I affix my signature in presence of two witnesses.

RICHARD H. RICE.

Witnesses:
DUGALD McK. McKILLOP,
WILLIAM M. LYONS.

Copies of this patent may be obtained for five cents each, by addressing the "Commissioner of Patents, Washington, D. C."